Dec. 12, 1933.   R. G. SMITH   1,938,940
TIRE MOUNTING TOOL
Filed Sept. 20, 1932   2 Sheets-Sheet 1
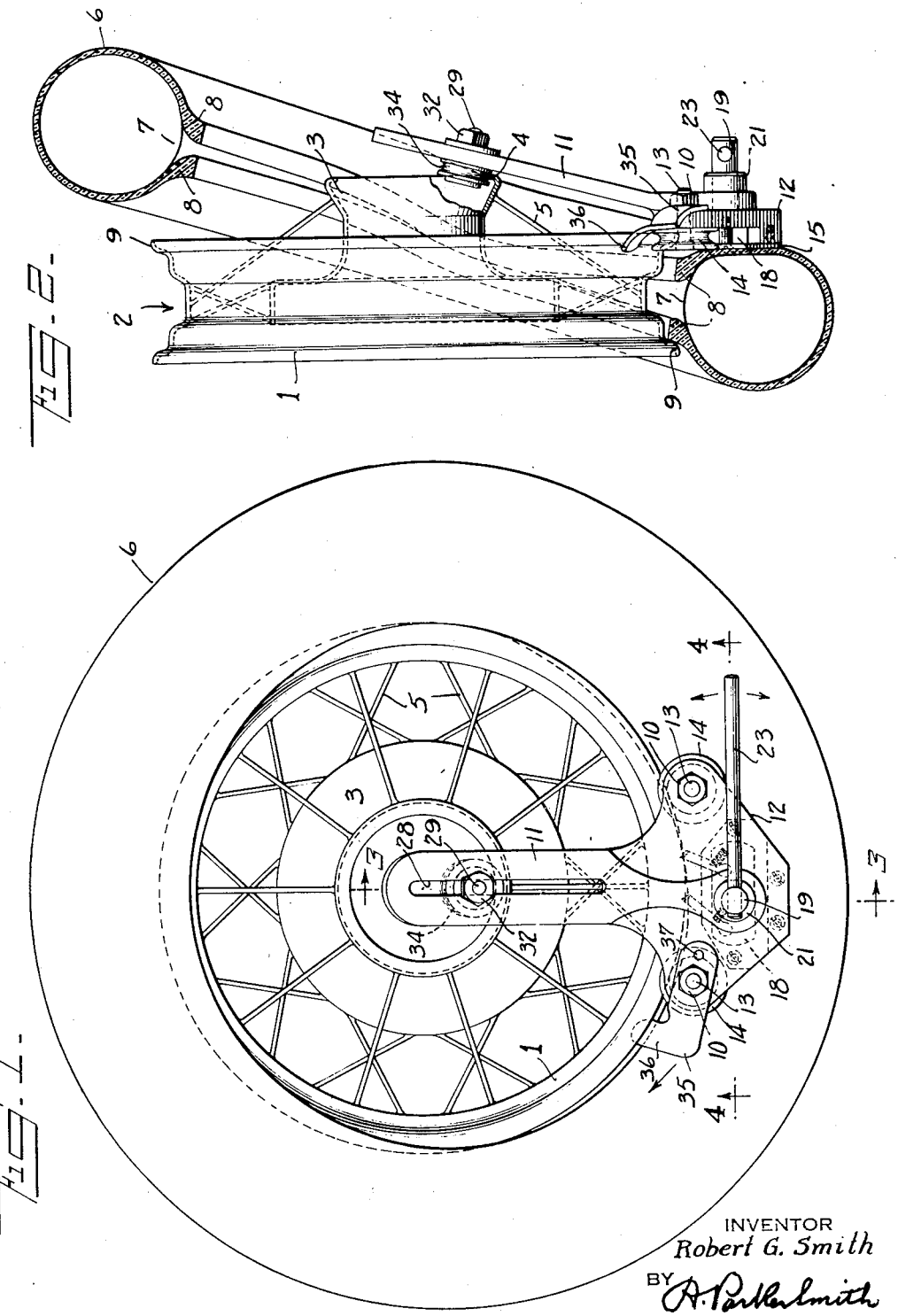

Dec. 12, 1933.  R. G. SMITH  1,938,940
TIRE MOUNTING TOOL
Filed Sept. 20, 1932   2 Sheets-Sheet 2
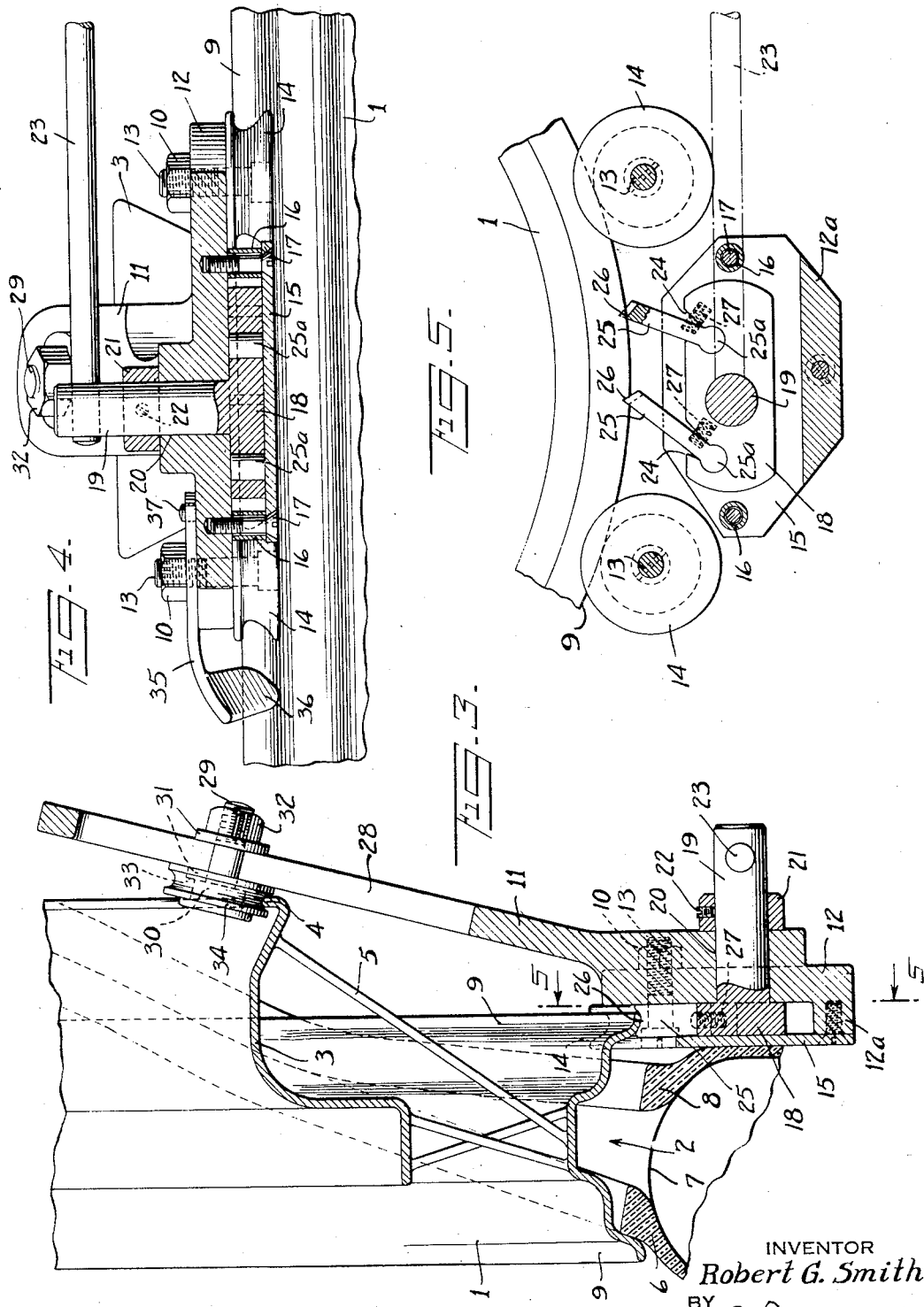
INVENTOR
Robert G. Smith
BY
ATTORNEY Patented Dec. 12, 1933

1,938,940

UNITED STATES PATENT OFFICE 1,938,940

TIRE MOUNTING TOOL

Robert G. Smith, West Orange, N. J.

Application September 20, 1932
Serial No. 633,948

6 Claims. (Cl. 157—6)

The object of the invention is the production of a simple, portable and easily operated tool which will rapidly force a heavy pneumatic tire into position on a wheel having fixed rim flanges without requiring the expenditure of any considerable force by the operator. In mounting heavy pneumatic tire casings on the solid rim wheels of relatively small diameter now commonly used a part of the tire is first placed loosely in the channel along one portion of the rim, but great difficulty is usually experienced in stretching the other portion of the heavy tire casing over the remainder of the flange of the wheel rim.

The present invention provides a simple tool which can be mounted on the wheel in a position radially thereof and forced circumferentially around the wheel hub while carrying a finger on its outer end which extends between the rim flange and the edge of the tire casing or shoe so as to force the portions of the casing edges before it over the rim flange into proper seated position on the wheel. A manually operable mechanism, preferably actuated on the step-by-step plan, is mounted on the tool and engages the wheel rim as a fulcrum, or track, so that when put in operation a continuous and considerable force is applied to drive the finger onward around the wheel rim against the resistance of the tire and thereby force it over the flange so as to complete its seating in the rim channel.

The best form of apparatus at present known to me embodying my invention is illustrated in the accompanying two sheets of drawings in which Fig. 1 is a side view of a wire wheel for motor cars with a tire in process of mounting thereon and a tool constructed in accordance with my invention in operative position.

Fig. 2 is a side elevation and partial section looking from the left side of Fig. 1.

Fig. 3 is a vertical section on line 3—3 of Fig. 1, on an enlarged scale, parts being broken away.

Fig. 4 is a horizontal section on an enlarged scale taken on line 4—4 of Fig. 1, parts being broken away, and Fig. 5 is a detail section on line 5—5 of Fig. 3.

Throughout the drawings like reference characters indicate like parts.

1 represents generally the rim of the wheel in the outer circumference of which is formed the channel 2 for holding the pneumatic tire. 3 is the hub having a short inturned flange 4 at its outer end and 5, 5, are wire spokes connecting the hub and rim. 6 represents standard form of casing or shoe for pneumatic tires having the thickened edges 8, 8, which cooperate with the flange 9, 9, of the rim 1 and the expanded inner tube 7 to hold the tire casing on the wheel when the inner tube is filled with compressed air.

In mounting such tire on the rim, it is customary to seat a portion of the tire casing in the channel of the wheel rim, as indicated in Fig. 2, and then force the remaining portions of the edges 8, 8, of the casing over the adjacent flange 9 of the wheel rim by means of hand tools which are inserted between the casing and the rim of the flange and act as levers to pry the casing over the remainder of the wheel flange. With small wheels and heavy tires this is an extremely difficult operation.

The tool here shown for more quickly and efficiently performing this completion of the tire mounting comprises in part a base frame composed of a slotted member 11 and a broader section 12 at one end of 11, and preferably bent at a slight angle thereto, as best shown in Fig. 2, and means for holding said frame in a radial position on the wheel. The preferred means for this purpose comprise grooved rollers 14 and 34. Bolts 13, 13, are set in the frame section 12 and their rollers 14, 14, revolve, while roller 34, at the other end of the frame, is mounted on the bolt 29 which is adjustable in the slot 28.

The bolts 13 screw into the plate 12 and are held by lock nuts 10 in such position as to permit the rollers 14, 14, to revolve freely. The bolt 29 has an enlarged offset portion 30 next its head which bears against the washer 31 (as best shown in Fig. 3) when the nut 32 on the end of the bolt is screwed down against a second washer 31 on the other side of the member 11. The roller 34 has a portion of its face countersunk, as indicated at 33, so as to fit over the washer and leave the roller free to revolve on the bolt.

35 is a finger adapted to be clamped against the face of the plate 12 by one of the bolts 13 and its nut 10, as best shown in Fig. 4, and the end of this finger has a curved lip 36 adapted to extend down into the channel of the wheel rim along the inner side of the adjacent flange 9. The other end of finger 35 has a perforation fitting over pin 37 set in plate 12 to ensure the accurate position of the finger.

When the tool has been mounted on the wheel, as best shown in Figs. 1 and 2, with the rollers 14 engaging the flange of the wheel rim, and the lip 36 of the finger 35 inserted within said flange, the grooved roller 34 is moved up into engagement with the flange 4 on the inner edge of the hub and clamped in that position by means of nut 32. If then, the tool is caused to travel around the rim of the wheel, the finger 35, 36, will gradually force the edges 8, 8, of the tire casing 6 over the rim flange, as indicated in dotted lines in Fig. 2. Additional grooved rollers may be employed where and if desired to avoid friction losses.

To supply sufficient force to thus move the tool I employ a manually operable mechanism mounted in the plate 12 and engaging the wheel rim. The preferred form of such mechanism, as shown, comprises a rocking member 18 having the pivot shaft 19 extending through hole 20 in the plate 12, and pawls 25, 25, pivoted on said member 18 on opposite sides of the pivot shaft 19 and having sharpened outer end edges 26, 26, engaging the rim flange. As shown these pawls have rounded ends 25a, which are seated in sockets 24, 24, cut in the member 18 and are held in engagement with the wheel rim by means of springs 27, 27. The pivot shaft 19 is transversely bored to receive an operating lever or handle 23 by which the member 18 may be rocked so that one of the pawls 25 will seat itself on the surface of the rim flange and act to force the tool to the left, (looking at Fig. 5) while the other pawl is drawn along the surface of the rim flange to seat itself in a new position and repeat the feeding operation when the lever 23 is swung in the opposite direction.

The rocking member 18 and the pawls 25, 25, are held in operative position on the face of plate 12, by means of cover plate 15, which rests on the raised portion 12a at one edge of plate 12, and is screwed thereto, and also rests on the short sleeves or thimbles 16, 16, which are placed under the cover plate 15 and held in position by screws 17, 17, passing through them and through holes in the plate, as best shown in Fig. 4. The rocking member 18 is also held in position by collar 21 on the projecting portion of its pivot shaft 19, said collar being held in position by setscrew 22.

In using the tool the parts are assembled as shown in the drawings and, the wheel being jacked up off the ground and free to rotate, the operator may hold the tool with one hand and swing the lever 23 back and forth with the other hand, thus causing the pawls 21, 21 to rotate the wheel rim and tire through the tool step by step until all portions of the edges of the tire shoe have been forced over the rim flange so as to properly seat the tire on the wheel ready for inflation. The nut 32 is then loosened, releasing grooved roller 34, so it may move away from the hub flange 4, and the tool is removed from engagement with the wheel.

Various changes could be made in the details of construction illustrated and described without departing from the underlying principle of the invention so long as the finger and carrying frame are mounted on the wheel so as to be capable of rotation around the rim and are provided with suitable mechanism for gradually forcing said finger around inside of the rim against the resistance of the edges of the tire casing.

Preferably the free ends 26 of the pawls 25, 25, are given a concave surface curvature approximating the cross sectional convex curvature of the adjacent surfaces of the flange 9 (as best shown in Fig. 3) so as to have a reasonably long line of contact with said flange when in operation.

Having described my invention, I claim:

1. A tool for use in mounting pneumatic tires on wheels which have rims with fixed flanges comprising, in combination, a base frame adapted to extend radially from the hub to the rim of a wheel, means for holding one end of said frame within the inner surface of one end of the wheel hub, means for guiding the other end of said frame about the adjacent flange of the rim of said wheel, a finger mounted on said last mentioned frame end and adapted to be inserted between the tire and said flange, and a manually operable mechanism mounted on said frame and engaging said rim and adapted to force said frame and finger circumferentially around said rim when operated, said mechanism comprising two friction members adapted to separately grip said rim, and means for moving said members alternately into and out of gripping position.

2. A combination such as defined in claim 1 in which said manually operable mechanism comprises a rocking member having a pivot mounting on said frame, two substantially parallel pawls pivoted thereto, one on each side of said pivot mounting, means for holding the free ends of said pawls yieldingly against the rim flange on which the tool is mounted; and means for manually rocking said member about its pivot mounting; whereby the alternate reciprocation of said pawls with reference to said frame while engaging said rim will cause step-by-step relative motion between said frame and rim.

3. A tool for use in mounting a pneumatic tire on a wheel having a channeled rim with fixed flanges which comprises the combination of a base frame adapted to extend from the rim to the hub of the wheel and having its end nearest said hub slotted longitudinally, a pair of groove rollers adapted to engage and ride on one flange of the wheel rim journalled on the other end of said frame, a third grooved roller adapted to engage and ride upon the inner circumference of one end of the wheel hub, and a journal for said last mentioned roller provided with a clamp for holding it in adjusted position in said slot.

4. An apparatus such as defined in claim 3 combined with a finger mounted on said frame adjacent the rim of the wheel and extending into the channel in said rim.

5. An apparatus such as defined in claim 3 combined with a finger mounted on said frame adjacent the rim of the wheel and extending into the channel in said rim and manually operable mechanism mounted on said frame and engaging said rim for causing relative motion between the said frame and rim.

6. A tool of the character described comprising, in combination, a loose frame, means carried by said frame adapted to engage a vehicle wheel having a rim with an edge flange and guide said frame around the outer surface of said flange, a finger carried by said frame and extending to the inner side of said flange, and manually operable mechanism mounted on said frame and engaging said flange and adapted, when operated, to cause relative motion between said frame and flange, circumferentially of the latter, together with a yieldable gripping member normally acting to prevent said frame from slipping in one direction along said rim while said mechanism is being operated to move said frame in the other direction.

ROBERT G. SMITH.